United States Patent [19]
Jones et al.

[11] Patent Number: 5,932,331
[45] Date of Patent: Aug. 3, 1999

[54] AUTOMOTIVE TRIM PANEL HAVING DUAL DENSITY FOAM SUPPORT LAYER

[75] Inventors: Vincent H-H Jones, Leonard; David L. Simon, Grosse Pointe, both of Mich.

[73] Assignee: Simco Automotive Trim, Inc., Roseville, Mich.

[21] Appl. No.: 09/168,842

[22] Filed: Oct. 8, 1998

[51] Int. Cl.⁶ .............................. B32B 31/20; B60J 5/00
[52] U.S. Cl. .................. 428/218; 428/304.4; 428/309.9; 428/316.6; 296/146.7
[58] Field of Search .................................. 428/31, 304.4, 428/309.9, 218, 316.6; 296/146.7

[56] References Cited

U.S. PATENT DOCUMENTS

| | | |
|---|---|---|
| 4,830,916 | 5/1989 | Fukuda et al. . |
| 5,022,943 | 6/1991 | Zaima . |
| 5,073,429 | 12/1991 | Steinke et al. . |
| 5,571,355 | 11/1996 | Kornylo . |
| 5,582,906 | 12/1996 | Romesberg et al. . |
| 5,837,172 | 11/1998 | Pritchard et al. . |

*Primary Examiner*—Deborah Jones
*Assistant Examiner*—Jason Savage
*Attorney, Agent, or Firm*—Dorn, McEachran, Jambor & Keating

[57] ABSTRACT

A trim panel for use in automotive trim applications is made from a laminate of a thermoformable support layer and an A-side layer made of vinyl or cloth or similar material. The laminate is thermoformed to impart permanently the contour of a rigid substrate to which the panel will be attached. The support layer retains the desired contour without the use of other materials. The support layer is made of an intermediate layer and a bottom layer of thermoformable foam. The foam layers have different densities to allow selection of the hand or touch of the A-side layer.

8 Claims, 2 Drawing Sheets

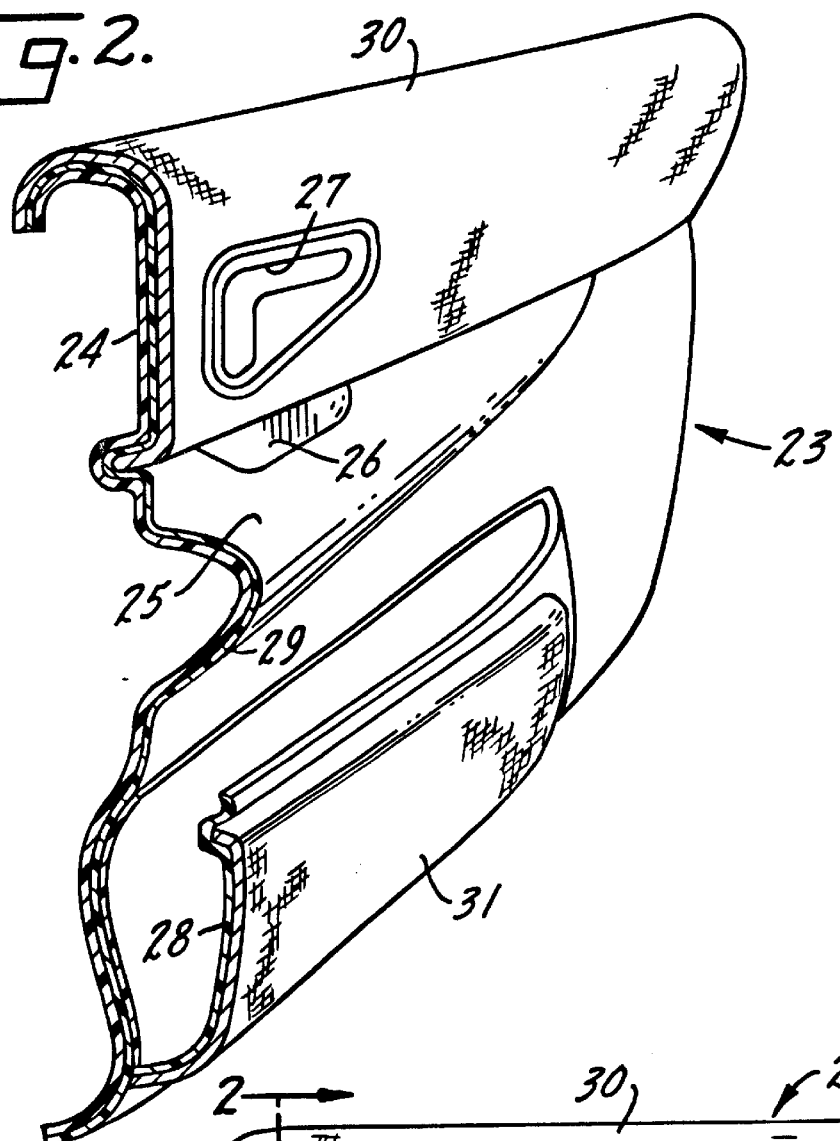
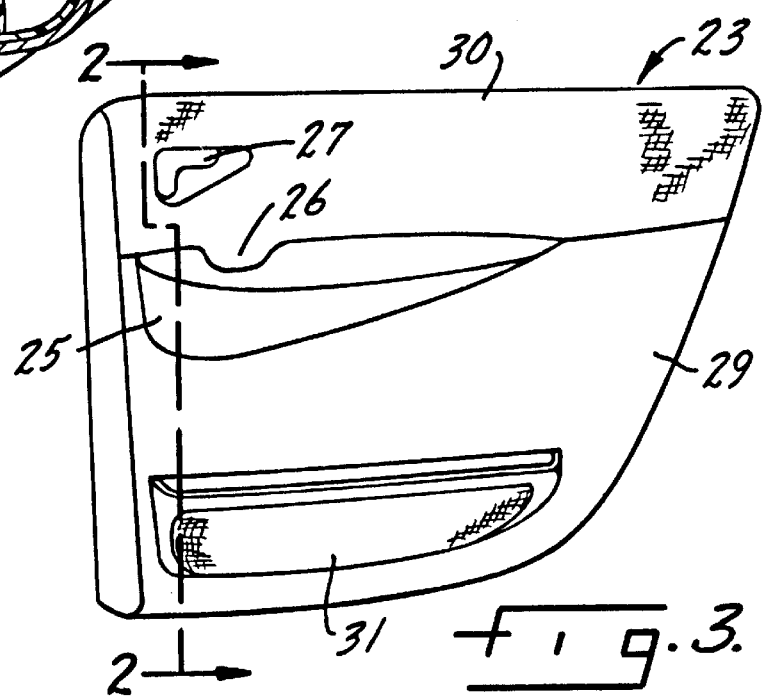

AUTOMOTIVE TRIM PANEL HAVING DUAL DENSITY FOAM SUPPORT LAYER

BACKGROUND OF THE INVENTION

The interior trim appearance of an automobile has been a key area of marketing focus. Interiors are often given treatments which provide increases in perceived value as well as brand differentiation. Efforts to cut costs by removing even small interior trim details have met with significant adverse sales impact.

The current automotive interior styling trend is toward a softer, wrap-around styling vision which places special emphasis on the tactile feel of the interior, as well as the visual impression. The hard plastic substrates and surfaces of car interiors in past years are being replaced by the trend toward padded or cushioned surfaces, covered by either vinyl or textile materials. Accordingly, parts such as instrument panels, arm rests, center consoles, seating, head rests, door skins and body pillar trim have increasingly been provided with soft, padded interior trim for styling purposes, for noise abatement and for safety concerns.

The automotive interior surfaces just described typically comprise a structural substrate of aluminum, plastic or the like which is relatively rigid. A layer of padding and a trim panel may cover the interior surface of the substrate. The term "relatively rigid" as used herein refers to the fact that the substrate has greater stiffness than the trim panel covering it. Obviously some flexibility is found in components such as door panel substrates.

The surface of the trim panel which is exposed to the passenger is referred to as an A-side layer. Typical materials for the A-side layer are leather, vinyl or textile materials, including cloth or carpet. Vinyl materials often have a cotton knit backing and textiles usually have a latex backcoating applied by the fabric manufacturers to stabilize the cloth. While the materials used as A-side layers serve their cosmetic purposes well, none of them by themselves provide the soft, padded or cushioned effect desired, nor will they retain a shape. Accordingly, a layer of padding and structure must be provided between the substrate and the A-side layer.

A preferred approach for a padded trim panel is to attach the padding to the A-side material and pre-form this laminate to the contour of the substrate. Such a pre-formed, pre-padded panel can then be attached to the substrate in a single step by any method and without the need for laborious hand contouring. A trim panel of this type is described and claimed in pending U.S. patent application Ser. No. 08/797,643, entitled "Automotive Trim Panel and Method of Making Same", invented by Vincent H-H. Jones and David L. Simon, and U.S. patent application Ser. No. 08/797,646, entitled "Method of Thermoforming an Automotive Trim Panel", invented by Vincent H-H. Jones, David L. Simon and Scott M. Kloock, both filed on Jan. 31, 1997 and assigned to the present assignee. The disclosures of these applications are incorporated herein by reference.

As mentioned above A-side materials by themselves cannot be formed into a permanent non-flat contour. The A-side materials on their own lack sufficient stiffness to retain any particular contour or shape, i.e., they will fold or collapse under their own weight. The referenced applications describe an A-side plus foam laminate material which overcomes these drawbacks and provides a self-supporting, contoured, padded trim panel ready for attachment to a substrate in any desired manner. Process controls are provided which allow thermoforming these parts in quantity with precise, repeatable accuracy. Thermoforming is defined as the forming of a thermoplastic sheet by heating it and then placing it into a mold to shape it. Cooling takes place in the mold so when the part comes out it will be self-supporting, i.e., it will retain the shape or contour of the mold.

The present invention is a further refinement of the trim panel described in the above applications. One of the characteristics of a trim panel A-side layer is the feel or tactile reaction to the textural qualities of smoothness, flexibility and softness, such as might be obtained when one brushes his or her hand across the surface of the A-side layer. This characteristic is referred to as the "hand" or "touch" of the material. Obviously determination of a desirable hand depends on the preferences of individual users and is thus quite subjective. However, objective factors can be measured and selected to allow designers to create a hand that might vary from a soft touch (sometimes referred to as a loose hand) to a somewhat stiffer feel. The former might be appropriate for a luxury automobile while the latter might be preferred by owners of sports cars. The primary factor in defining a hand is the lateral spring rate of a material, i.e., the spring rate in a direction parallel to the surface. The perpendicular spring rate defines the amount of cushion a user will feel.

It has been found that the spring rates of thermoformable foams used in the making of automotive trim panels are primarily dependent on the density of the foam. Given the typical range of thicknesses of foam, a foam density of about 2.7 to about 4.0 pounds per cubic foot is required to achieve the perpendicular spring rate that produces the desired cushioned feel. But the lateral spring rate for foam of this density is too large to allow for a feeling of a soft touch or loose hand.

SUMMARY OF THE INVENTION

The present invention is directed to a new material for use as an automotive trim panel and a method for making a panel that allows selection of the hand of the panel. The trim panel has an A-side layer laminated to a dual-density thermoformable support layer.

The support layer is actually two laminated layers of thermoformable foam, each layer having a density that is different from the other layer. Thus, the trim panel has an A-side layer, an intermediate foam layer next to the A-side layer, and a bottom foam layer next to the intermediate foam layer.

The thermoformable foam could be urethane, polyethylene or polypropylene foam. Either the urethane or polyethylene foam may be either closed or open cell, and may be thermo or chemically cross-linked. A typical range of thickness for the support layer is about 0.080"–0.320", although the invention is not limited to this range.

BRIEF DESCRIPTION OF THE DRAWINGS

FIG. 2 is a schematic perspective view, with a portion in section, of an automotive interior door panel with the trim panel of the present invention attached thereto. The sectional portion of FIG. 2 is taken along line 2—2 of FIG. 3.

FIG. 3 is a front elevation view, on a reduced scale, of the trim panel of FIG. 2, showing the section line for the view of FIG. 2.

DETAILED DESCRIPTION OF THE INVENTION

Figure 1:
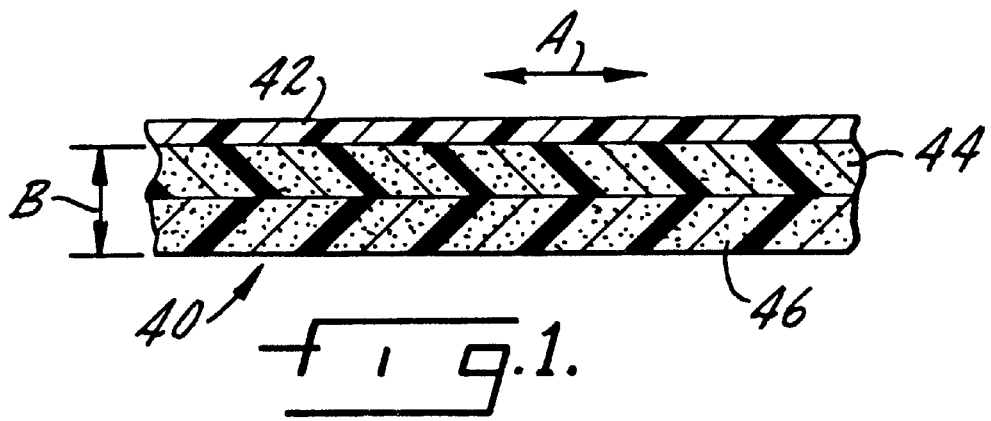
FIG. 1 is an enlarged section through a portion of the laminate of the present invention, prior to thermoforming, showing the layers thereof in a preferred embodiment.

A preferred embodiment of the laminate for the present invention is shown generally at 40 in FIG. 1. The laminate comprises an A-side layer 42, an intermediate foam layer 44 and a bottom foam layer 46. Together the foam layers 44 and 46 define a thermoformable support layer. The A-side layer 42 is made of vinyl as described above. Vinyl A-side layers have a typical thickness of about 0.030" to 0.050".

The intermediate layer 44 is preferably closed cell urethane foam having an initial thickness in the range of 0.040" to 0.160" and a density less than 1.0 pound per cubic foot. The bottom layer 46 is also a closed cell urethane foam having an initial thickness in the range of 0.080" to 0.160" and a density of between 2.7 to 4.0 pounds per cubic foot. The three layers 42, 44 and 46 are laminated together, such as by flame laminating. In a flame laminator a thin portion of a foam layer is liquified which will allow the foam layer to be laminated either to the A-side layer or the other foam layer. Sintered lamination could be also be used. Sprayed adhesives could be used.

In the described embodiment the intermediate foam layer 44 has a low density (less than 1.0 pound per cubic foot) and thus a low lateral spring rate. The lateral spring rate is measured in a direction parallel to the plane of the A-side layer, as indicated by line A. The bottom foam layer 46 has a different, higher density of about 2.7 to 4.0 pounds per cubic foot. The higher density means the bottom layer has a higher lateral spring rate. The lateral spring rate of the bottom layer 46 may be on the order of ten times the lateral spring rate of the intermediate layer 44. Because the intermediate layer 44 is adjacent the A-side material 42, the low lateral spring rate of the intermediate layer is the primary contributor to the hand of the panel. The high lateral spring rate of the bottom layer 46 does not adversely impact the hand because the bottom layer 46 is isolated from the A-side layer 42 by the intermediate layer 44. Also, while the perpendicular spring rate (in the direction of line B in FIG. 1) is somewhat softened by the presence of the low density intermediate layer, it is still in an appropriate range because vertical forces on the panel involve the spring rates of both the intermediate and bottom layers.

It can be seen that the dual density support layer allows a designer to select a hand or touch suitable for his or her particular application. The embodiment disclosed above will effect a soft touch or loose hand.

Alternate thermoformable foams includes polyethylene or polypropylene foam. Any of these may be either closed or open cell, and may be thermo or chemically cross-linked. Also, it will be understood that the thicknesses and densities specified are examples only and the invention is not limited to those specifically set forth. For example, the dual density support layer of the present invention could advantageously be applied to a trim panel having a shirred appearance as disclosed in U.S. patent application Ser. No. 08/797,641, filed Jan. 31, 1997 and assigned to the present assignee, the disclosure of which is incorporated herein by reference. In such an application it may be desirable to create the shirred appearance by compressing the material into the grooves of the thermoforming tooling. The thickness of the starting material would then be increased to about 2 to 12 mm for the bottom layer foam.

An example of a trim panel on which the material of the present invention could be used is an upper bolster for the top portion of an interior door panel. Such a bolster is shown as part of the complete door panel shown generally in FIGS. 2 and 3 at 23. The panel includes a relatively rigid substrate 24, which forms no part of the present invention. The substrate defines a contour which includes an arm rest 25, an indentation 26 (forming a door pull) and a door latch opening 27. A rigid substrate 28 for a map pocket is added to the basic substrate 24. The substrate 24 is covered with a skin 29 which is formed in accordance with this invention from a thermoformed foam support layer and a vinyl A-side layer. The upper bolster 30, typically with a cloth A-side layer is added on the top portion of the skin. Similarly, a cloth map pocket insert 31 is applied to the map pocket substrate 28.

Figure 4:
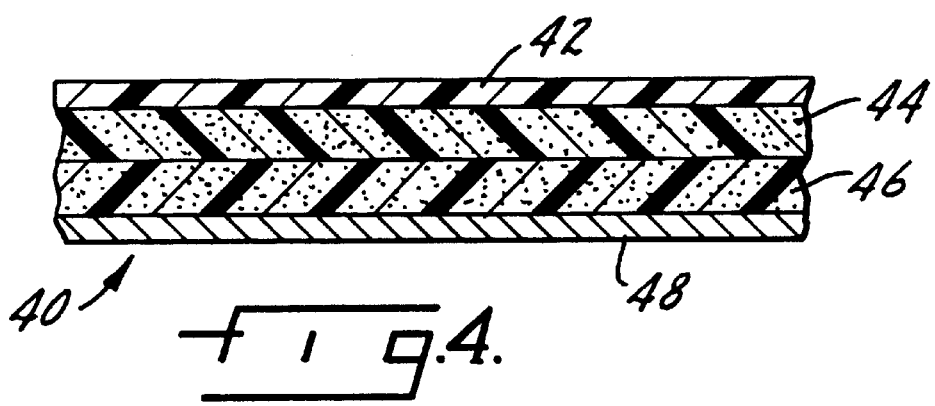
FIG. 4 is a section similar to FIG. 1, showing an alternate embodiment.

An alternate embodiment of the trim panel is shown in FIG. 4. This embodiment is the same as FIG. 1 with the addition of a backing layer 48 of felt attached to the bottom foam layer 46. This has the advantage of providing a stiffer part while still having the desired hand.

While a preferred form of the invention has been shown and described, it will be realized that alterations and modifications may be made thereto without departing from the scope of the following claims. For example, the foam for the intermediate layer may be chosen such that it has a higher density, and therefore a higher lateral spring rate, than the bottom layer.

We claim:

1. A panel for covering a substantially rigid substrate having a non-flat contour, the panel comprising an A-side layer and a thermoformable support layer attached to the A-side layer, the support layer comprising an intermediate foam layer having a density of less than 1.0 pound per cubic foot attached to the A-side layer and a bottom foam layer having a density of about 2.7 to about 4.0 pounds per cubic foot attached to the intermediate foam layer, the A-side layer by itself having insufficient stiffness to retain a particular shape, the support layer having sufficient stiffness to impart to the panel a permanent, non-flat contour generally matching that of the substrate.

2. The panel of claim 1 wherein the foam layers are made from one of the group of urethane, polyethylene or polypropylene.

3. The panel of claim 1 wherein the A-side layer is vinyl.

4. The panel of claim 1 further comprising a backing layer made of a thermoformable material and attached to the bottom foam layer such that the intermediate and bottom foam layers are between the A-side layer and the backing layer.

5. A panel for covering a substantially rigid substrate having a non-flat contour, the panel being made by the process of laminating together A-side and support layers, the A-side layer by itself having insufficient stiffness to retain a particular shape, the support layer comprising intermediate and bottom thermoformable foam layers, the intermediate foam layer having a density of less than 1.0 pound per cubic foot and the bottom foam layer having a density of about 2.7 to about 4.0 pounds per cubic foot, and thermoforming the laminated layers into a non-flat contour generally matching that of the substrate with the support layer having sufficient stiffness to permanently retain said contour.

6. The panel of claim 5 wherein the foam layers are made from one of the group of urethane, polyethylene or polypropylene.

7. The panel of claim 5 wherein the A-side layer is vinyl.

8. The panel of claim 5 further comprising the step of laminating to the support layer a backing layer made of thermoformable material such that the foam layers are between the A-side layer and the backing layer.

\* \* \* \* \*